United States Patent [19]

Schroeder

[11] Patent Number: 4,598,846

[45] Date of Patent: Jul. 8, 1986

[54] HANDLEBAR BICYCLE BAG

[76] Inventor: Frederick R. Schroeder, 524 Duncan Ave., Alexandria, Va. 22301

[21] Appl. No.: 702,019

[22] Filed: Feb. 15, 1985

[51] Int. Cl.⁴ .............................................. B62J 7/06
[52] U.S. Cl. .................................... 224/36; 224/30 A
[58] Field of Search ..................... 224/30 R, 30 A, 31, 224/32 R, 35, 36

[56] References Cited

U.S. PATENT DOCUMENTS 2,552,443  5/1951  Molinari .
3,955,728  5/1976  Jackson et al. ...................... 224/31
3,955,730  5/1976  Montgomery ........................ 224/36
4,415,105  11/1983  Jackson .

Primary Examiner—Stephen Marcus
Assistant Examiner—David Voorhees
Attorney, Agent, or Firm—Parkhurst & Oliff

[57] ABSTRACT

The invention relates to a bag or article carrier for attachment to dropped handlebars of a bicycle. The bag is preferably secured to the dropped handlebars by an endless cord which is attached to the bag at three locations. The cord is looped over the curved portions of the dropped handlebars, and then stretched to loop over the stem of the handlebars. A locking mechanism may be provided to secure the cord more firmly about the stem of the bicycle.

8 Claims, 5 Drawing Figures

HANDLEBAR BICYCLE BAG

BACKGROUND AND SUMMARY OF THE INVENTION

A. Field of the Invention

The present invention relates generally to an article carrier for bicycles. More particularly, the present invention relates to a bicycle bag for mounting on dropped bicycle handlebars.

B. Prior Art

Bicycle bags per se are known. For example, U.S. Pat. No. 2,552,443 to Molinari discloses a mesh or net flexible handbag having flexible carrying straps which can be used to mount the handbag on English style handlebars by repeatedly wrapping the straps around the handlebars so as to form a continuous spiral. Such a bicycle bag has a number of disadvantages. The bag portion must be very flexible to allow the straps to be conveniently and securely wrapped around the handlebars. When the bag is full, particularly with rigid or bulky objects, it is awkward to fully wrap the straps around the handlebars. Further, even if the straps are fully wrapped around the handlebars, the bag is unrestrained against pivotal motion and therefore can sway back and forth when the bicycle is in motion. In addition, the straps are particularly difficult to wrap around dropped handlebars, especially if hand brakes are provided thereon.

U.S. Pat. No. 3,955,728 to Jackson et al (Jackson '728) discloses a handlebar bag for use on dropped handlebars. The Jackson '728 handlebar bag has a first pair of two upper straps, each upper strap being attached at one end thereof to opposite sides of the bag. The free end of each upper strap has a releasable fastener to allow the upper straps to be wrapped around the opposite portions of the handlebar above the hand brakes. A second pair of two lower elastic shock straps extend downwardly from each side of the bag for attachment to the front wheel axle area of the bicycle. The two shock straps provide stabilization of the bag, but create the risk that the stabilizing straps can become entangled in the front wheel if the straps should disengage while the bicycle is in motion. Further, the use of four straps on the handlebar bag complicates the attachment and removal of the bag from the handlebars. Still further, an additional strap is required to connect the free ends of the upper straps in order to provide a shoulder strap for carrying of the bag by a person.

Another handlebar bag for dropped handlebars is disclosed in U.S. Pat. No. 4,415,105 to Jackson (Jackson '105). The Jackson '105 handlebar bag has a bent wire frame having a central loop portion which cooperates with the handlebar mounting stem, the handlebars, and a separate latch member to support a bag between the handlebars. The rigid frame provides support for the bag and prevents swaying, thereby obviating the need for straps such as those disclosed in the Jackson '728 patent. However, the Jackson '105 mounting arrangement is complicated, and, depending on the latch member embodiment employed, requires complicated manipulation of the latch member to attach or remove the frame.

It is an object of the present invention to provide a handlebar bag which obviates the disadvantages associated with the handlebar bicycle bags of the prior art.

It is a further object of the present invention to provide a handlebar bag which is quickly and easily attached or removed from the handlebars of the bicycle.

Another object of the present invention is to provide a handlebar bicycle bag which is easily stabilized so as to prevent swaying of the bag when attached to the handlebars.

It is a further object of the present invention to provide a handlebar bicycle bag which is attached to the handlebars by a single endless cord, the endless cord also functioning as a handle for manually carrying the bag.

Another object of the present invention is to provide a handlebar bicycle bag which does not require a mounting frame or other special mounting elements to attach the bag to the handlebars.

C. Summary of the Invention

An article carrier constructed in accordance with the present invention includes a container having mounting means for attaching the container to the handlebars. The mounting means defines first, second and third mounting loops for supporting the container between first and second curved portions of the handlebars. The first and second loops cooperate with the first and second curved portions, respectively. The third loop cooperates with a mounting stem for the handlebars. In a preferred embodiment, the first, second and third loops are sections of an endless cord.

In accordance with the present invention, an article carrier is mounted between dropped handlebars of a bicycle by looping the first and second loops around the curved portions of the handlebars, extending the third loop over a central portion of the handlebars, and then looping the third loop over the mounting stem for the handlebars to secure the article carrier to the handlebars.

BRIEF DESCRIPTION OF THE DRAWINGS

A preferred embodiment of the present invention will be described in detail with reference to the appended drawings in which like elements bear like reference numerals and wherein.

DETAILED DESCRIPTION OF THE PREFERRED EMBODIMENT

Figure 1:
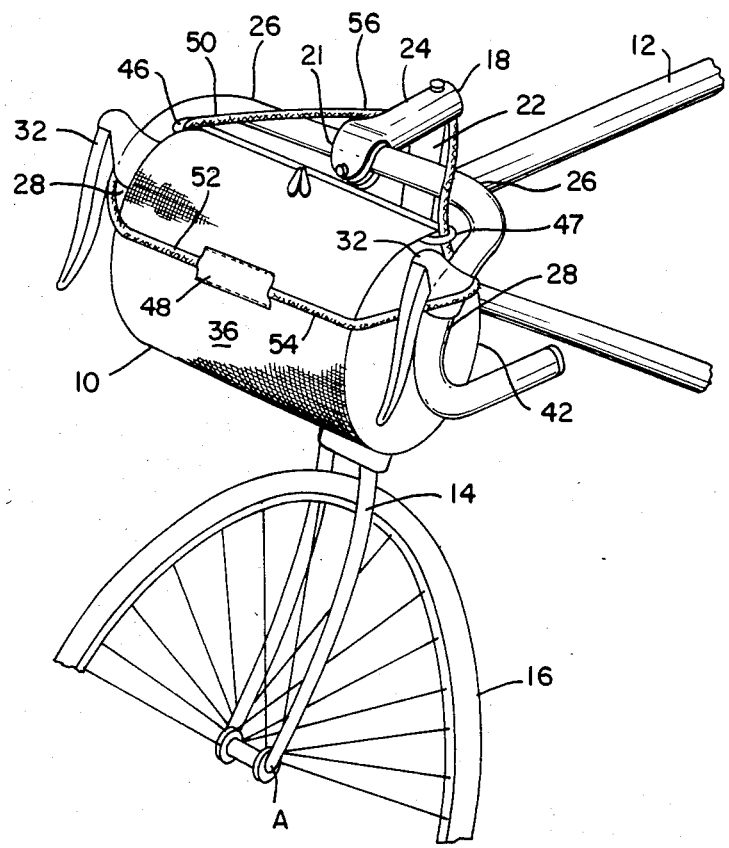
FIG. 1 is a perspective view of the article carrier in accordance with the present invention attached to dropped handlebars of a bicycle.

The article carrier or handlebar bag 10 in accordance with the present invention is primarily intended for use on a bicycle, the front end of which is illustrated in FIG. 1. The bicycle includes, among other things, a frame 12 which carries a front fork 14 for a bicycle wheel 16. The wheel 16 defines a first plane and a rotational axis A of the wheel 16 defines a line perpendicular to the first plane.

The frame 12 also includes fork stem 17 (FIG. 3) into which an L-shaped mounting stem 18 is inserted. The L-shaped stem 18 includes a generally vertical leg 22 for attachment to the fork stem 17 and a generally horizontal leg 24 to which handlebars 20 are attached through a collar 21. Preferably, the handlebars 20 are dropped handlebars in which a straight or central portion 26 extends through the collar 21 to each side of the wheel 16. Curved portions 28 extend downward in a plane parallel to the plane of the wheel 16 from each end of the straight portion 26. Hand brakes 32 are provided on the curved portions 28 for operating the bicycle's brakes in a well-known manner (cables for operating the hand brakes are not shown). While the bicycle bag in accordance with the invention is preferably supported by dropped handlebars, other types of conventional handlebars may be substituted.

Figure 2:
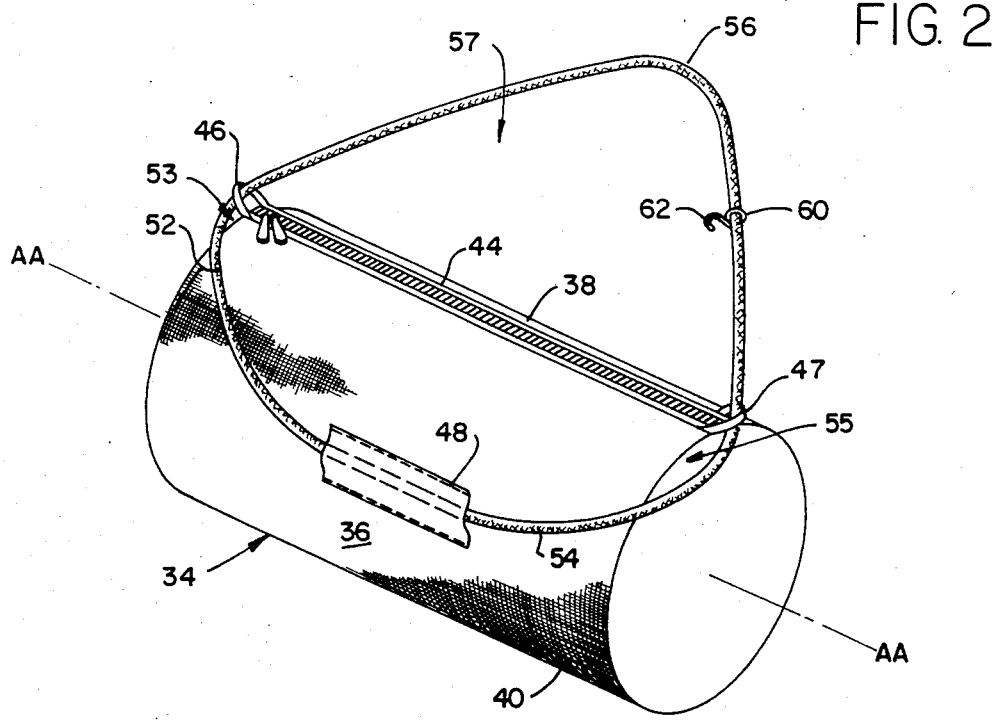
FIG. 2 is a perspective view of the article carrier in accordance with the present invention.

The bag 10 is illustrated in FIG. 2. Preferably, the bag has a cylindrical shape, with a major axis AA. When mounted between the curved portions of the handlebars, the bag 10 includes a middle portion 34 which defines a front portion 36, top portion 38, bottom portion 40 and rear portion (not shown). A side disc 42 is located at each end of the middle portion 34 in a plane transverse to the major axis. The bag 10 may include an access opening and a mechanism for closing the access opening. In the preferred embodiment, the access opening is located generally parallel to the major axis along the top portion 38 of the bag. A zipper 44 or similar mechanism opens and closes the access opening.

Preferably, the bag is made of a flexible cloth-like material such as nylon or canvas. The side discs and zipper are sewn to the middle portion if a flexible cloth-like material is used for the bag. In addition, it is noted that the bag may take any form (e.g., cylindrical, box-like, etc.) which is capable of carrying contents. Moreover, the bag may be of any material, rigid or flexible.

A pair of side eyelets 46, 47 or attaching means are located on each side of the bag along a line parallel to the major axis. Each side eyelet 46, 47 is a thin strip of material having it ends attached to the bag to form an open area between the strip and the bag. Preferably, the side eyelets 46, 47 are located on the top portion 38 of the bag adjacent opposite ends of the access opening and zipper 44. As shown, the side eyelets 46, 47 may be located at the ends of the zipper 44, but may advantageously also be located forwardly or rearwardly of the zipper 44, or below the zipper 44 on the side discs 42.

A front eyelet 48 or attachment means is provided on the front portion 36 of the bag at a central area between the top 38 and bottom portions 40. The front eyelet 48 is an elongated strip of material in which the edges of the strip are attached to the front portion 36 to form a tunnel-like open area between the strip and the front portion. The open area is generally parallel to the major axis of the bag. It is noted that the front eyelet may be a single thin strip similar to a side eyelet, rather than an elongated strip. In addition, several thin strips may be provided in lieu of a single elongated strip. Regardless of the shape, number, or form of the front eyelet, it is important that the front eyelet provide an opening arranged in a direction generally parallel to the major axis of the bag. The front and side eyelets may be made of a flexible or rigid material. If a flexible material is employed, the strips can be sewn to the bag.

A cord 50 or line means surrounds the bag and is preferably flexible and elastic. The cord is threaded through the open areas defined by the front and side eyelets 46, 47, 48 and is preferably movable within the eyelets. It is noted, however, that the cord may be fixedly secured to either the strips or the bag at the locations of the front and side eyelets to eliminate the need for such eyelets. The cord is preferably endless. However, three separate cords extending between each eyelet may be used instead of a single endless cord. If endless, the cord has a minimum length sufficient to extend across the front face of the bag and between the side eyelets. It is advantageous, however, to provide more than the minimum length of cord so that any excess can be used as a handle if the bag is to manually carried.

With the cord 50 threaded through the front and side eyelets as illustrated in FIG. 2, the cord is divided into three loops. A first loop 52 is defined between one side eyelet 46 and the front eyelet 48. A first open area 53 is located between the first loop 52 and the bag 10. A second loop 54 is defined between the other side eyelet 47 and the front eyelet 48. A second open area 55 is bounded by the bag 10 and the second loop 54. A third loop 56 is the remainder of the cord between the side eyelets 46, 47 but unattached to the front face. A third open area 57 exists between the third loop 56 and the bag 10.

Figure 3:
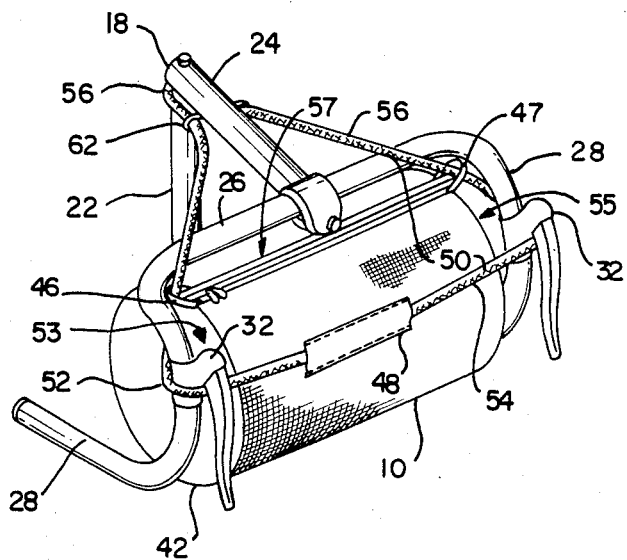
FIG. 3 is an enlarged perspective view of the article carrier of FIG. 2 illustrating the attachment of the article carrier to handlebars with an endless cord.

The attachment of the bicycle bag to the handlebars is illustrated in FIGS. 1 and 3. To secure the bag to the handlebars, the bag is placed between the handles such that a side disc 42 is adjacent each handlebar. The major axis AA of the bag is thus generally parallel to the wheel axis A. The first loop 52 of the cord between the front eyelet 48 and one side eyelet 46 loops around the curved portion 28 on one side of the handlebars to a location beneath the hand brake 32. In other words, the curved portion 28 on one side of the handlebars is received within the first open area 53. In FIG. 3, the looping of the first loop 52 is illustrated as step #1.

The second loop 54 of the cord between the front eyelet 48 and the other side eyelet 47 is then looped over the curved portion 28 of the other handlebar (step #2 in FIG. 3) in a similar manner such that the curved portion is received within the second open area 55. The looping of the first and second loops over the curved portions 28 of the handlebars is possible because the cord is not secured to the bag at the first and second open areas. The looping of the cord over the curved portions is facilitated if the cord is elastic.

When looping the first and second loops 52, 54 over the curved portions 28, the first and second loops are first positioned such that the first and second loops extend across an outside surface of the curved portion below the hand brakes 32. The first and second loops then extend across an inside surface of the curved portion above the hand brakes 32 and angle upward toward the side eyelets 46, 47. The arrangement of the first and second loops about the hand brakes reduces the tendency of the loops to slide up the curved portions toward the straight portion.

The third remaining loop 56 of the cord between the side eyelets 46, 47 but not attached to the front portion of the bag is then extended over the straight portion 26 of the handlebars toward the stem 18. The third loop 56 is looped over the stem 18 to secure the bag to the handlebars. That is, the stem 18 is received within the third open area 57. If the cord is elastic, it can be stretched to loop over the generally vertical arm 22 of the stem 18 to a position lower than the generally horizontal arm 24 of the stem. The looping of the third portion is illustrated as step #3 in FIG. 3.

The endless cord provides the support for the bag on the handlebars. The first and second loops 52, 54 of the cord lying across the front portion of the bag prevent forward and rearward swaying of the bag or any rotation of the bag about the axis of the wheel. Wrapping the first and second loops around the handlebars provides additional stability while preventing sliding of the first and second loops on the curved portions. The prevention of sliding of the first and second loops is further enhanced by locating the side eyelets adjacent the curved portions of the handlebars (i.e., maximizing the spacing between the side eyelets), thereby forming a tight loop around each curved portion. The third loop 56 between the side eyelets and stretched over the straight portion and stem supports the bag on the handlebars and provides additional stability. Since the cord is elastic, the bag is securely urged against the frame while suspended between the handlebars. Further, since the cord is flexible, shocks are not easily transmitted through the cord from the bicycle to the bag.

To provide additional support to the bag when mounted, a hook and eyelet may be attached to the third loop of the cord 50. The cord is threaded through eyelet 60 (FIG. 2) which is then closed around the cord. When the bag is mounted on the bicycle (FIG. 3), the hook 62 is extended underneath the generally horizontal stem arm 24 and locked to the cord on the opposite side of the stem, thus connecting opposing sections of the third loop. The connection or locking of the opposing sections of the third loop with the hook and eyelet serves a dual function: (1) it forms a tight loop around the vertical leg 22 of the neck 18 thereby more securely fastening the cord to the handlebars; and (2) it takes up slack in the cord 50 to reduce swaying.

Removal of the bag from the handlebars is the reverse of the attachment method. The hook 62 is first unlocked from the opposing sections of the third loop to eliminate the tight loop around the vertical leg 22 of the stem 18. The hook 62 remains attached to the cord 50 by the eyelet 60. The third loop is then stretched and lifted over the stem. The first and second loops of the cord slide off the curved portions 28 of the handlebars to remove the bag. The third portion of the cord is used as a handle for manually carrying the bag when detached from the bicycle.

Figure 4:
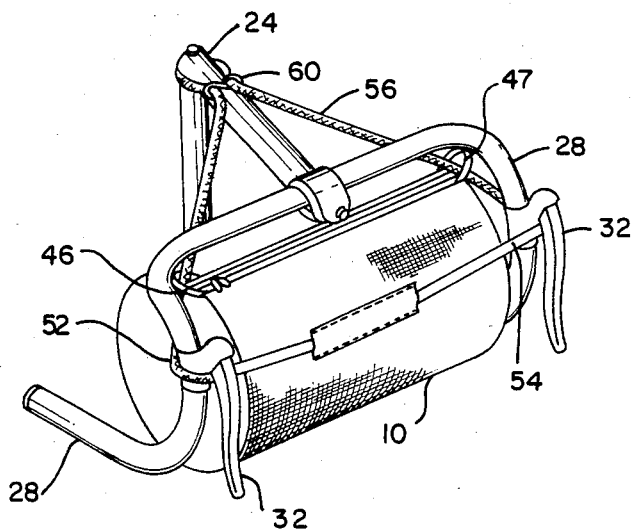
FIG. 4 is a perspective view of the article carrier of FIG. 2 illustrating a secod embodiment for attaching the article carrier to the handlebars.
Figure 5:
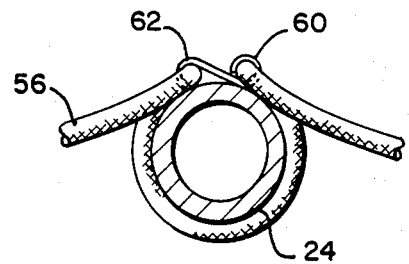
FIG. 5 is a cross-sectional view taken along the line V—V of FIG. 4.

Another method of attaching the bag 10 to the handlebars is illustrated in FIG. 4. The first and second loops 52, 54 are looped around the first and second curved portions 28 of the handlebars. The third loop 56 is drawn toward the underside of the generally horizontal arm 24 of the stem. Sections of the third loop on opposite sides of the stem are drawn upward along the sides of the horizontal arm 24 and locked together with the hook and eyelet as shown, thereby forming a collar loop 70, the open end of which being closed by the hook and eyelet. As shown in FIG. 5, the collar loop 70 includes the hook and eyelet extending across a top surface of the arm 24 and the opposing sections of the third loop which extend along the undersurface and sides of the arm 24. The collar loop 70 may alternatively be formed around the generally vertical arm 22.

While the present invention has been described in its preferred embodiment, it is to be understood that the invention is not limited thereto. Those skilled in the art recognize that variations or modifications may be made to the invention without departing from the scope of the invention. For example, the shape of the bag may vary and other attachment mechanisms may be substituted for the front and side eyelets. The cord need not be unitary, but may include a mechanism at each end of cord for attaching the ends together. In addition, the bicycle bag may be supported on handlebars other than dropped handlebars. Accordingly, the foregoing detailed description of the preferred embodiment should be considered exemplary in nature and not as limiting to the scope and context of the invention as defined in the following claims.

What is claimed is:

1. An article carrier for releasably mounting to handlebars of a bicycle, the handlebars being mounted at a central location on the bicycle by a mounting stem, said handlebars defining first and second curved portions on either side of a central portion extending through said stem, said article carrier comprising:
   a container for receiving articles having a front portion and a top portion when said article carrier is mounted between said handlebars;
   an uninterrupted cord attached to said container for attaching said container to said handlebars, said cord being attached to said container at first, second and third locations to define first, second and third mounting loops, said first location being located on the front portion of the container such that said cord extends transversely across said front portion and between said handlebar curved portions when said article carrier is mounted to said handlebars, said second and third locations being located on said container adjacent the curved portions of said handlebars when said article carrier is mounted between said handlebars, said first and second loops being looped around the first and second curved portions of the handlebars, respectively, and said third loop passing over or under said central portion of said handlebars to engage said mounting stem; and
   locking means for releasably securing opposing sections of said third loop to said mounting stem, said locking means being located on said cord opposite from said first location and in contact with said stem when said article carrier is mounted between said handlebars.

2. The article carrier of claim 1 wherein said uninterrupted cord is an endless cord.

3. The article carrier of claim 2 wherein said cord is slidably attached to said container.

4. The article carrier of claim 2 wherein said cord is elastic.

5. The article carrier of claim 1 wherein said mounting stem has a generally horizontal first arm supporting said central portion of said handlebars and a generally vertical second arm connecting said first arm to said bicycle, said third loop passing over said central portion of said handlebars and engaging said second arm of said mounting stem, said locking means being located beneath said first arm.

6. The article carrier of claim 1 wherein said second and third locations on said container are spaced above said first location.

7. The article carrier of claim 1 wherein said mounting stem has a generally horizontal first arm supporting said central portion of said handlebars and a generally vertical second arm connecting said first arm to said bicycle, said third loop passing under said central portion of said handlebars and engaging said first arm of said mounting stem, said locking means being located above said first arm.

8. The article carrier of claim 1 wherein said curved portions of said handlebars have an inside surface and an outside surface, a hand brake is located on the outside surface of each of said first and second curved portions and the first and second loops extend across the outside surface of the curved portions beneath the hand brakes, and extend across the inside surface of the curved portions above the hand brakes.

* * * * *